Dec. 15, 1942.                R. WELLENSTEIN ET AL                2,305,307
              ELECTRON TUBE VOLTMETER IN BRIDGE CONNECTION
                       FOR MEASURING DIRECT VOLTAGES
                            Filed Nov. 16, 1939

Inventors,
R. Wellenstein
W. Holle
By:
Glascock Downing & Seebold
Attorneys

Patented Dec. 15, 1942

2,305,307

UNITED STATES PATENT OFFICE 2,305,307

ELECTRON TUBE VOLTMETER IN BRIDGE CONNECTION FOR MEASURING DIRECT VOLTAGES

Robert Wellenstein and Werner Holle, Bremen, Germany; vested in the Alien Property Custodian Application November 16, 1939, Serial No. 304,838
In Germany October 5, 1938

4 Claims. (Cl. 171—95)

The present invention relates to an electron tube voltmeter in bridge connection for measuring direct voltages with compensation for the residual current flowing at the zero value of the voltage to be measured by means of a compensation voltage derived from the anode voltage, particularly for echo sounding instruments for aircraft and ships. The known electron tube voltmeters of this kind are unsuitable for service on board vessels, as their indication mostly depends, to a high degree, upon variations of the operating voltage and is not proportional to the voltage to be measured.

An object of the invention resides in obviating these disadvantages and to provide an electron tube voltmeter the indication of which is proportional to the direct voltage to be measured and is, to a high degree, independent of variations of the operating voltage.

This problem has been solved by the invention by arranging the electron tube, together with a cathode resistance, so as to form a part of the four bridge arm resistances and by connecting the positive pole of the voltage to be measured to the grid.

The invention includes means for compensating variations of the anode voltage by introducing a compensation voltage derived from the anode voltage into the grid circuit. Thus it is possible to make use of the advantage of employing the bridge connection not only in conjunction with a triode but also in pentode connection, as the disturbance of the bridge effect, owing to the pentode connection, is balanced by the grid compensation. On the other hand, the use of the pentode has the advantage that the bridge arm resistances may have a high resistance, thus obtaining a relatively large instrument current.

Figure 1:
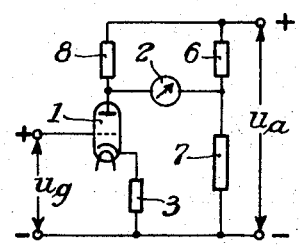
Figure 2:
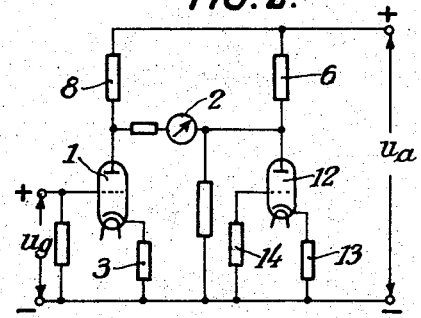

The invention is illustrated by several constructional examples in the accompanying drawing, in which:

Fig. 1 is one form of construction of an electron tube voltmeter according to the invention, Figs. 2 to 6 are modifications of the form of construction shown in Fig. 1.

The electron tube voltmeters illustrated consist of an electron tube 1 or 15, to the control grid of which the positive pole of the direct voltage to be measured is applied, and the anode current of which is indicated by a measuring instrument 2 and is used as a measure for the voltage applied to the grid; $u_a$ is the anode voltage.

In the anode circuit of the tube there is inserted a cathode resistance 3 which is so dimensioned that the produced voltage is equal to or higher than the voltage applied to the grid. As experiments have shown, this cathode resistance enables the otherwise curved measuring characteristic to have a straight course down to the zero value of the voltage to be measured. Thus, with proper adjustment of the measuring instrument 2 or by suppressing the residual current existing at the zero value of the voltage to be measured, a well proportional measuring characteristic is obtained.

The cathode resistance 3 also has the advantage that, without any further auxiliary arrangements, it is possible to compensate variations of the heating voltage to a great extent, if the resistance is given a certain minimum magnitude, which may be higher or lower according to the inner resistance and other characteristics of the tube used and to the kind of connection. As will be seen from the drawing, bridge connections are employed in which the tube 1 or 15, together with the cathode resistance 3 as shown in Figs. 1, 2, 5, and 6 or by itself (Figs. 3 and 4), forms one of the four bridge arm resistances.

In the bridge connections according to Figs. 1 to 5, the bridge balance is disturbed merely by the application of the voltage to be measured $u_g$ to the control grid so that a bridge current flows corresponding to this voltage to be measured. Changes in the anode voltage, however, do not influence the balance of the bridge. In order to utilize the greatest possible part of the anode current for the measurement, the resistance 6 on the other side of the bridge from the triode and the adjoining resistance 7 should be dimensioned accordingly. The connections have the great advantage that they are, to a great extent, independent of variations of the anode voltage. Variations of the anode voltage are no more noticeable with regard to their absolute extent, but merely proportional to the magnitude of the voltage to be measured. Also the resulting influence of the variations of the anode voltage proportional to the measuring voltage is considerably smaller than should be expected, if only the known bridge equations are considered. This is due to the fact that the bridge arm resistance, in which the triode 1 is arranged, changes simultaneously with the anode voltage in such a way that a decrease in the anode voltage is accompanied by a decrease in the bridge arm resistance. Thus it may be determined that the change in the bridge current amounts to less than 1% when the anode voltage varies by 15%.

The bridge connection has the advantage that the tubes are easily exchangeable without requiring a considerable alteration of the connection. If a different tube is inserted in the connection and the bridge is adjusted to a zero value for the voltage $u_g$, but leaving the cathode resistance unchanged, there results a maximum deviation of ±3% for the sensitivity of different tubes of the same type. This fault is easily compensated by means of the cathode resistance by determining the voltage $u_g$ with a voltmeter and then adjusting the respective instrument current.

The bridge connection may also be made independent of variations of the heating voltage in replacing a second bridge arm resistance by a triode 12 with cathode resistance 13 and grid resistance 14, causing these two bridge arm resistances to always change to the same extent upon variations of the heating voltage. Then, the balance of the bridge is not changed by variations of the heating voltage. With this kind of connection (Fig. 2) the indication is practically completely independent of both variations of the anode voltage and of the heating voltage. In particular, the variations of the voltage do not produce an absolute error in the indication.

Figure 3:
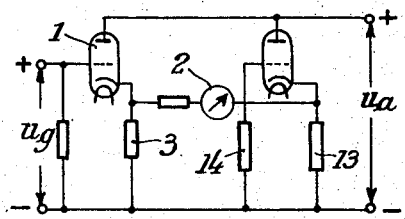
Figure 4:
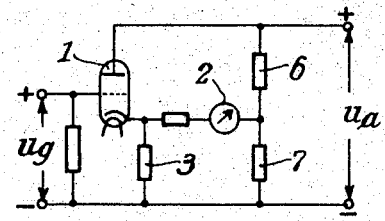

As shown in Figs. 3 and 4, the bridge connection may also be altered so that the bridge connection is directly at the cathode, in which case only a part of the anode current flows through the cathode resistance.

Figure 5:
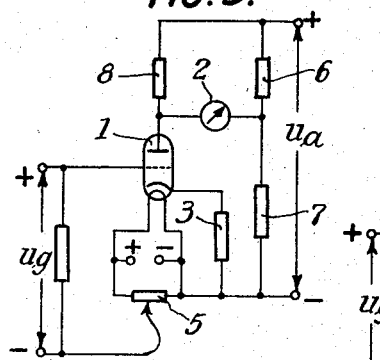

If it is only the question of compensating variations of the heating voltage, a compensation voltage derived from the heating voltage may be applied in series with the measuring voltage, as illustrated in Fig. 5.

Figure 6:
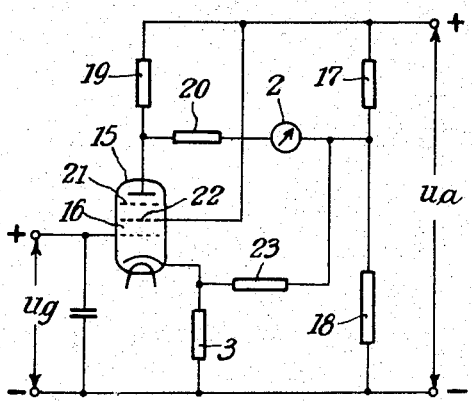

In the connection according to Fig. 6, the tube 15 is formed as a pentode, differing from the connections according to Figs. 1 to 5. The suppressor grid 21 of the pentode is connected to the cathode as usual. The screen grid 22 is, in the example illustrated, connected directly to the positive pole of the anode battery.

The pentode connection has the advantage that the required measuring current may be obtained at a small total current consumption. This is due to the fact that with a pentode the anode current is nearly independent of the anode voltage and therefore an anode current sufficient for the measurement flows at anode voltages down to nearly zero. This makes it possible to select higher resistances 19 and 17 and therefore also 18 in the anode circuit, than in the case of the triode connection, without a noticeable decrease in the anode current. With the higher resistances it is attained that the part of the anode current flowing through the measuring instrument increases, although at the pentode a part of the anode current flows through the screen grid directly back to the anode battery. As the proportion between the anode current and the screen grid current is more favourable with large pentodes than with small pentodes, the advantage of the pentode connection is particularly marked in the case of large pentodes.

As the tube current is now practically independent of the anode voltage and only dependent of the screen grid voltage, the bridge connection has no compensating effect upon variations in the voltage of the anode battery, as was the case with the triode connection. The compensation of the variations of the anode voltage is attained with the pentode connection by introducing into the grid circuit of the pentode an auxiliary voltage independent of the anode voltage. In the example illustrated, this is effected by connecting the cathode with the bridge branch through a resistance 23. Thus, a current depending upon the battery voltage is conducted over the cathode resistance 3 which causes there a corresponding additional grid bias. The proportion between the resistance 23 and the resistance 3 is given by the magnification factor of the screen grid.

The pentode connection also has the advantage that the upper bend of the tube characteristic (anode voltage as a function of the grid voltage) can be used for making it straight. The bending, in itself positive, of the normal tube characteristic is compensated by the negative bending, which is due to the fact that the anode voltage goes down to zero.

When exchanging tubes, the zero-point of the measurement must be regulated with the resistance 23.

The tube voltmeter illustrated is, to a great extent, independent of variations of the voltage, both of the anode battery and of the heating battery. For example, with 17% underheating or overheating there results an error of measurement amounting to about 2% of the maximum value of the scale. Changes in the anode voltage from, for example, 200 to 250 volts cause an error in the measuring current of merely +2% of the respective indication. The cathode resistance can be decreased, as compared with the triode connection, without any grid current arising, however to a certain degree only, as otherwise the characteristic becomes curved. On the other hand it is well, not to select too large a cathode resistance, in order not to decrease the tube current to an unnecessary extent. For increasing the measuring range, the cathode resistance must be increased in proportion to the measuring ranges, and the resistance 23 should be selected accordingly.

Of course, the invention is not restricted to the examples illustrated, as various modifications and other constructions are possible. In particular, the new tube voltmeter may be used for measuring alternating voltages if, by inserting a suitable apparatus, the alternating voltage is rectified.

What we claim is:

1. An electron tube voltmeter for measuring direct voltages comprising, a resistance bridge having four bridge arms connected to form a closed circuit, an operating voltage source connected at two bridge arm connecting points belonging to different bridge arms, an indicator connected at the other two bridge arm connecting points, an electron tube having an anode and a cathode and a control grid, a cathode resistance, the anode cathode resistance of the tube together with the cathode resistance forming a part of the four bridge arm resistances and the cathode resistance being traversed only by the emission current of the tube, and the control grid of the electron tube being connected with the positive terminal of the direct voltage to be measured, said cathode resistance having a value such that the negative biasing potential impressed upon said control grid by the emission current flowing through said cathode resistance establishes a substantially linear relation between the anode current and the impressed grid voltage.

2. An electron tube voltmeter for measuring direct voltages comprising, a resistance bridge having four bridge arms connected to form a closed circuit, an operating voltage source connected at two bridge arm connecting points belonging to different bridge arms, an indicator connected at the other two bridge arm connecting points, an electron tube having an anode and a cathode and a control grid, a cathode resistance, the anode cathode resistance of the tube together with the cathode resistance forming a part of the four bridge arm resistances and located in the same bridge arm and the cathode resistance being traversed only by the emission current of the tube, the control grid of the electron tube being connected with the positive terminal of the direct voltage to be measured, and the negative terminal of the measuring voltage being located at the end of the cathode resistance away from the cathode, said cathode resistance having a value such that the negative biasing potential impressed upon said control grid by the emission current flowing through said cathode resistance establishes a substantially linear relation between the anode current and the impressed grid voltage.

3. An electron tube voltmeter for measuring direct voltages comprising, a resistance bridge having four bridge arms connected to form a closed circuit, an operating voltage source connected at two bridge arm connecting points belonging to different bridge arms, an indicator connected to the other two bridge arm connecting points, an electron tube having an anode and a cathode and a control grid and a screen grid, a cathode resistance, the anode cathode resistance of the tube together with the cathode resistance forming a part of the four bridge arm resistances, and the cathode resistance being traversed by the emission current of the tube and a current for compensating the disturbance of the bridge balance caused by the screen grid current of the pentode, and said compensation current being derived from the operating voltage source by-passing the tube.

4. An electron tube voltmeter according to claim 1 wherein said cathode resistance has a value such that the negative biasing potential impressed on the control grid by the emission current flowing through said cathode resistance is of the same order of magnitude as the direct voltage to be measured.

ROBERT WELLENSTEIN.
WERNER HOLLE.